United States Patent [19]

Newcomb et al.

[11] Patent Number: 4,978,960
[45] Date of Patent: Dec. 18, 1990

[54] METHOD AND SYSTEM FOR REAL APERTURE RADAR GROUND MAPPING

[75] Inventors: Gary L. Newcomb, Catonsville; Timothy E. Brandt, Hanover; Scott C. Borden, Greenbelt; Joseph Stevenson, Catonsville, all of Md.

[73] Assignee: Westinghouse Electric Corp., Pittsburgh, Pa.

[21] Appl. No.: 290,205

[22] Filed: Dec. 27, 1988

[51] Int. Cl.[5] .................. G01S 13/89; G01S 13/90
[52] U.S. Cl. ................................. 342/25; 342/191
[58] Field of Search ............... 342/22, 190, 191, 25, 342/149, 154, 158

[56] References Cited

U.S. PATENT DOCUMENTS

| H741 | 2/1990 | Powell et al. | 342/25 |
| 4,134,113 | 1/1979 | Powell | 342/25 |
| 4,321,601 | 3/1982 | Richman | 342/25 |
| 4,359,732 | 11/1982 | Martin | 342/191 |
| 4,387,373 | 6/1983 | Longuemare, Jr. | 342/25 |
| 4,442,431 | 4/1984 | Bleakney | 342/62 |
| 4,489,322 | 12/1984 | Zulch et al. | 342/149 |
| 4,723,124 | 2/1988 | Boles | 342/25 |
| 4,837,577 | 6/1989 | Peregrim et al. | 342/80 |
| 4,853,699 | 8/1989 | Easton | 342/25 |
| 4,866,448 | 9/1989 | Rocca et al. | 342/25 |
| 4,872,012 | 10/1989 | Chabries | 342/25 |
| 4,879,559 | 11/1989 | Arambepola | 342/25 |

Primary Examiner—Thomas H. Tarcza
Assistant Examiner—John B. Sotomayor
Attorney, Agent, or Firm—W. G. Sutcliff

[57] ABSTRACT

A system for real beam radar ground mapping using a monopulse antennae to determine off-boresight angle of target returns. Off-boresight angle is converted to azimuth bins. After processing, return energy for each contiguous azimuth bin of an illuminated area is dumped during a respective "look" of the antenna.

18 Claims, 10 Drawing Sheets

METHOD AND SYSTEM FOR REAL APERTURE RADAR GROUND MAPPING

BACKGROUND OF THE INVENTION

The present invention relates to radar mapping; and more particularly to an improved method and system for real aperture radar ground mapping.

A conventional real aperture mapping radar is typically a non-coherent system that utilizes the return power or energy seen by the radar antenna to make a paint of the ground as the antenna scans the area being mapped. The resolution in the range dimension is determined by sampling the reflected radio frequency energy at a selected rate, thus creating range gates. However, the angular or azimuth resolution is determined by the angular width (beamwidth) of the transmitted beam of RF energy. Azimuth resolution is relatively poor when compared to reasonably achievable range resolution. For example, the range resolution for a map at ten nautical miles may be 150 feet; but the azimuth resolution for a beam width of three degrees is about three thousand one hundred eighty feet at ten nautical miles. Thus, the location of a corner reflector or other target with respect to range can be determined to be anywhere within a one hundred fifty foot range interval, but the location in azimuth of the reflector can be anywhere within the three thousand one hundred eighty foot azimuth interval.

Range resolution can be improved readily by increasing the sampling rate. However, improvement in azimuth resolution of a real aperture ground mapping system was heretofore achieved only by decreasing the width of the transmitted beam. This could be accomplished by either increasing the physical size of the radar antenna, or by increasing the frequency of the transmitted RF energy. Neither of these solutions were attractive. Increasing the physical size of the radar antenna is costly at best; and because the ground mapping radar is mounted in an airborne platform, it may not readily support the extra weight, or there may be insufficient space to accommodate the larger size antenna. Moving to a higher frequency also has its disadvantages. For example, at higher frequencies there is a greater attenuation of the reflected energy in the presence of rain; and because of considerations related to other modes of the radar system, it may not be possible to use a frequency that gives a desirably small beamwidth.

SUMMARY OF THE INVENTION

One of the objects of the present invention is to provide an improved method and system for improving azimuth resolution in real aperture ground mapping without a corresponding increase in the physical size of the antenna or the frequency of the transmitted RF energy.

Another object of the present invention is to provide such a method and system that is relatively uncomplicated, and comparatively inexpensive to implement.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects, and in accordance with the purpose of the present invention, as embodied and broadly described herein, the method of radar ground mapping in accordance with this invention comprises scanning a monopulse antenna having a central boresight over a ground surface area to be mapped, transmitting along the boresight a plurality of radar pulses, each having a predetermined angular beamwidth, during each of a plurality of spaced azimuth intervals, each azimuth interval defining an antenna look, the radar pulses during each look illuminating a ground area corresponding to the beamwidth thereof; receiving and detecting at the antenna during each look return energy of the reflected pulses of the illuminated area at distinct times corresponding to respective range intervals; calculating the off-boresight angles of the return energy at each range interval; converting the calculated off-boresight angles to azimuth bins corresponding to respective distances over the illuminated surface at a particular range interval; and displaying on a screen the return energy for each of the total number of azimuth bins of the antenna beamwidth.

In another aspect of the invention, a system for ground mapping as embodied and broadly described herein, in accordance with this invention comprises a monopulse antenna having a central boresight, means for scanning the antenna over a ground surface area to be mapped, means for transmitting along the boresight a plurality of radar pulses, each having a predetermined angular beamwidth, during each of a plurality of spaced azimuth intervals, each azimuth interval defining an antenna look, the radar pulses during each look illuminating a ground area corresponding to the beamwidth thereof; means for receiving and detecting at the antenna during each look return energy of the reflected pulses of the illuminated area at distinct times corresponding to respective range intervals; means for calculating the off-boresight angles of the return energy at each range interval; means for converting the calculated off-boresight angles to azimuth bins corresponding to respective distances over the illuminated surface at a particular range interval; and means including a screen for displaying the return energy corresponding to each of the total number of azimuth bins of the antenna beamwidth.

The accompanying drawings, which are incorporated in and constitute a part of the specification, illustrate one embodiment of the invention, and together with the description serve to explain the principles of the invention.

DESCRIPTION OF THE PREFERRED EMBODIMENT

Monopulse Ground Mapping of the present invention is a radar mode for generating ground map displays in which the azimuth resolution is improved over conventional real beam ground mapping through the use of off-boresight monopulse data collection and processing. The mode requires the use of an antenna that is capable of outputting the complex sum of the returned energy across the whole antenna (the Sum Channel data) and the complex difference between the energy received at one half of the antenna (the Difference Channel data) Sum channel and difference channel data are simultaneously collected. The ratio of the delta channel data to the sum channel data is proportional to the angle off-boresight of the centroid of the received energy for the particular range interval of the particular pulse. So, from the sum channel and delta channel data, the centroid of the angle off-boresight in the azimuth direction is computed for each range interval or each pulse. The real antenna beamwidth is divided into a number of parts of bins, each bin being a fraction of the antenna beamwidth wide. A value proportional to the strength of the radar reflector is added to the bin indicated by the off-boresight processing of the monopulse data. In other words, the radar return for each range interval of a transmitted pulse is treated as a reflector that is one bin wide. The radar beam is moved in azimuth by as much as one bin size and the process is repeated. Hence, as the radar beam is swept across an area on the ground, an integrated set of data is accumulated in the array of bins. This array of data bins is converted to display format and put up on a display device Thus, for each beam position or "look", the horizontal and vertical data is processed to determine the azimuth off-boresight angle from the center of the beam From this angle, the azimuth of the target return is computed The desired system gain is applied to the return energy; and this energy is added to the correct range/azimuth cell. The resultant data is compressed and displayed.

Prior to describing the present preferred embodiment and related method, the principles of the present invention as contrasted with a conventional real beam ground mapping system are now discussed with reference to FIGS. 1 and 2 in order to assist in providing a certain insight for a better understanding as the detailed description progresses.

Figure 1:
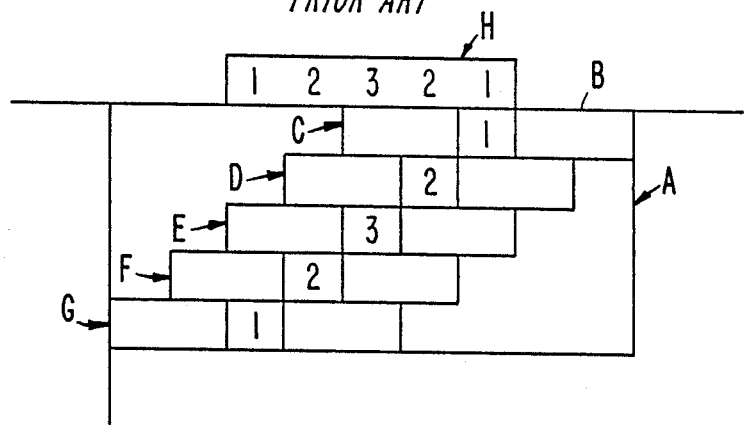
FIG. 1 is a diagram for aiding in describing the principles of real aperture ground mapping without the benefit of the present invention.
Figure 2:
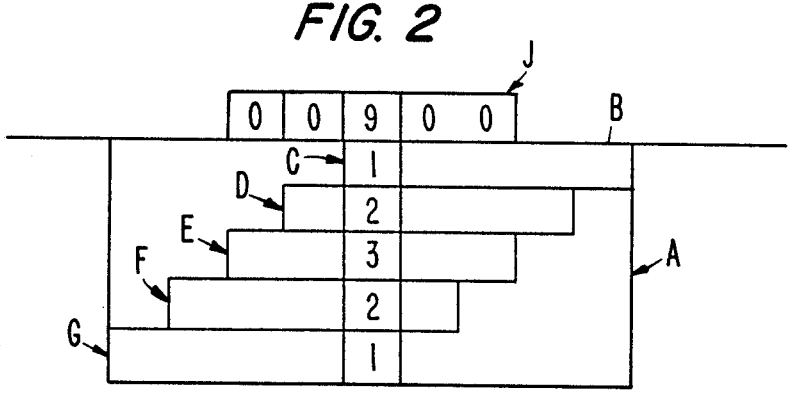
FIG. 2 is a diagram for aiding in describing the principles of real aperture ground mapping with the benefit of the present invention.

Referring to FIGS. 1 and 2, a boundary rectangle A represents, in the horizontal dimension as viewed in the drawings, a distance scanned by a radar beam from right to left during five successive radar "looks", for example. Line B represents the far range of an illuminated area. Individual rectangles referred to at C,D,E,F, and G each represent in the horizontal dimension, the beamwidth of the radar with the position of each rectangle being offset to illustrate the illuminated distance in azimuth of each successive "look". The vertical dimension of each of rectangles C,D,E,F, and G represents a time interval for the entire beamwidth with C being the most distant and G being the closest of the five contiguous cells. The individual squares containing numerals (1),(2),(3),(2), and (1), represent incremental distances in azimuth for the particular range cell. The reference numerals per se represent the distance of a target from the beam centroid, which is described as the intensity of a reflected target return; that is, numeral (1) corresponds to the least reflected intensity or greatest distance from the centroid and numeral (3) corresponds to a target at the centroid or having the greatest reflected intensity for a given range. For clarity of illustration, only one rectangular swath is shown for each range, it, of course, being understood that there would be overlapping rectangles C,D,E,F, and G in azimuth for each range.

With reference to FIG. 1, as the beam is scanned from right to left, and assuming the rectangles represent the same range with a target located approximately in the center of boundary rectangle A, as the beam first illuminates the target represented by "look" C, the screen would exhibit intensity (1) for the target, which of course could be any place within the beam. During the next look, the target would exhibit an intensity (2), because it would be closer to the centroid, and the next look would provide an intensity (3). Thus, "look" E would accurately depict the center of the target. However, since these intensities would be painted on the screen as the beam scans, the target would be blurred over the total integrated "looks" that detected the target. Thus, in the illustrated diagram, a target at the centroid of "look" E would be blurred in azimuth throughout a distance that included all five successive looks, as indicated by the sums of the intensities of the integrated beams in block H.

With the benefit of the present invention, and referring to FIG. 2, when "look" C detects the target at the edge of the beam, it still has the same intensity as in FIG. 1; however, the processing of the present invention positions the target at the appropriate azimuth bin near the edge of the beam of "look" C. During the next "look" D, the target is closer to the center of the beam; and the processing of the present invention places the target at the same location in azimuth as it did for "look" C. Similarly, for each successive "look" the target's reflected intensity, whatever it may be, is confined to the actual azimuth increment until the scanning beam no longer illuminates the target. As seen from FIG. 2, the integrated "looks" provide a sharp cut-off when placed in a particular azimuth bin as represented by rectangle J. As exemplified by rectangle J, the bins on either side of the actual location of the target fall off sharply in reflective value during integration of the five successive "tabs"; while the adjoining azimuth bins as exemplified by rectangle H, in FIG. 1 decrease gradually on either side of the target blurring the target over the total beamwidth.

Reference will now be made in detail to the present preferred embodiment of the invention, an example of which is illustrated in the accompanying drawings wherein like legends and reference numerals, to the extent possible, refer to corresponding parts and functions throughout the different Figures.

Figure 3:
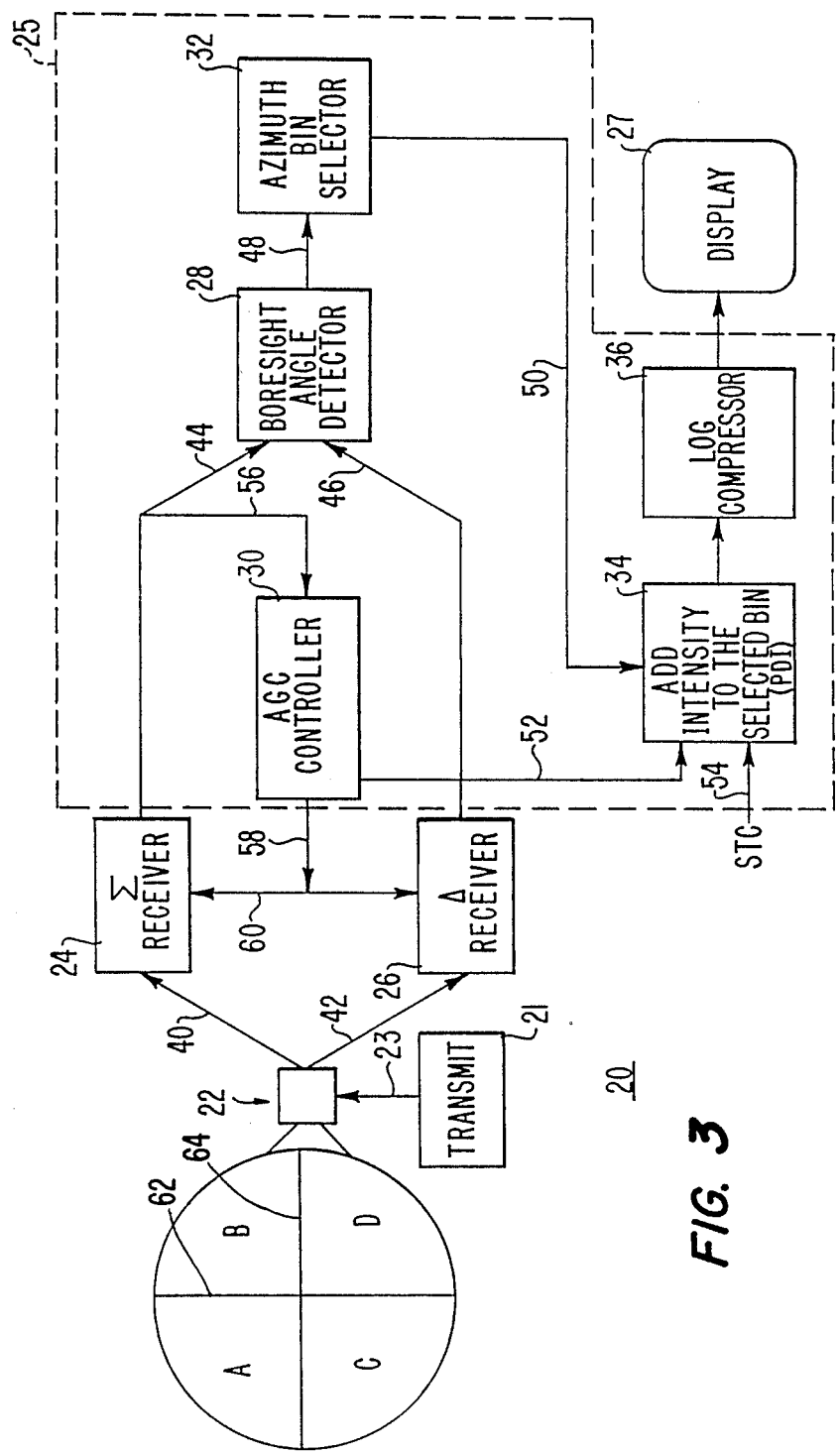
FIG. 3 is a schematic functional block diagram of a ground mapping system in accordance with the present invention.

Referring to FIG. 3, a ground mappinq system in accordance with one embodiment of the present invention is generally referred to as 20; and includes a radar pulse transmitter 21, a monopulse type radar antenna 22, a SUM Σ channel receiver 24, and a DIFFERENCE Δ channel receiver 26. System 20 further includes a programmable signal processor 25 and a display 27. Signal processor 25 of the system includes a boresight angle detector 28, an automatic gain controller 30, an azimuth bin selector 32, a post detection integrator 34, and a LOG compressor 36.

Radar transmitter 21 is connected to antenna 22 over output line 23; and in turn, antenna 22 is connected by output lines 40 and 42 to SUM and DIFFERENCE channel receivers 24 and 26, respectively. Receivers 24 and 26 are connected by respective output lines 44 and 46 to programmable signal processor 25, which functionally connects to boresight angle detector 28, which in turn is connected over output line 48 to azimuth bin selector 32. Post detection integrator 34 (PDI) is connected at an input thereof to azimuth bin selector 32 over line 50; and is connected to an output of automatic gain controller 30 over line 52. A sensitivity time control input (STC) is input to PDI 34 over line 54. Automatic gain controller 30 has an input connected by line 56 to line 44, which line connects Σ channel receiver 24 to boresight angle detector 28. In addition to output line 52, AGC controller 30 has an output line 58 connected to line 60, which line commonly connects receivers 24 and 26.

Antenna 22 is preferably a conventional phased array monopulse radar antenna, which is divided into four segments as represented by dividers 62 and 64, and is capable of transmitting radar pulses received from transmitter 21 for illuminating a ground area covering a particular distance in azimuth and elevation, receiving the return energy of the transmitted pulses, and outputting the complex sum of the returned energy across the entire four segments, referred to as Σ channel data over line 40, and outputting the complex difference between the energy received at one half of the antenna and the energy received at the other half of the antenna, referred to as Δ channel data, over line 42.

Antenna 22 electronically scans in azimuth to illuminate the ground area to be mapped. At each of predetermined angular increments of scan, referred to as "looks", transmitter 21 transmits a plurality of radar pulses of various frequencies selected to optimize the detectability of different ground targets. Each angular scanning increment or "look" preferably corresponds to a predetermined azimuth interval or bin. For example, assuming a beamwidth of three degrees and a range of ten nautical miles the beamwidth illuminates a swath of approximately three thousand feet. Thus, where it is desired to have a resolution in azimuth of approximately 100 feet, thirty periodic "looks" of radar pulse transmissions are required to be transmitted during a three degree scan angle of the antenna. In other words, the antenna has a maximum of thirty "looks" during a three degree scan in azimuth, or a "look" can occur every one-tenth of a degree in the scan. In actual practice, anywhere from thirty to four hundred "looks" may be effected during an angular scan in azimuth depending on the actual angular beamwidth of the radar pulse.

Figure 4:
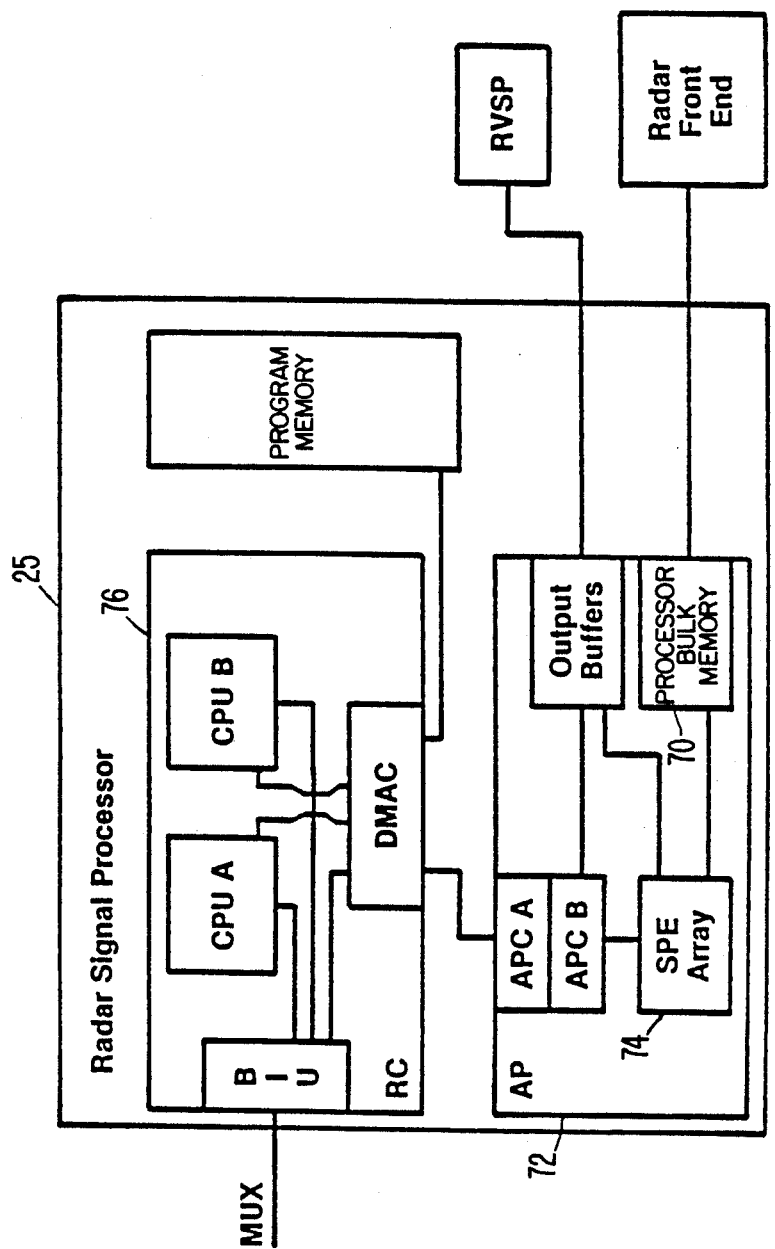
FIG. 4 is a schematic block diagram of a programmable signal processor that may be used in implementing the functions of the present invention.

Referring to FIG. 4, the method and system of the present invention may be carried out in programmable radar array signal processor 25, which can be of any well known type. Such a signal processor preferably includes a processor bulk memory (PBM) 70, an array processor 72 that includes signal processing modular elements (SPE) 74, and a pair of general purpose computers APC A and APC B. The signal processing system also includes a radar computer (RC) 76 which includes a pair of central processing units CPU A and CPU B. The central processing units control the overall system 25 and PBM 70. PBM 70 conventionally includes an array of bulk memory elements 74 (not shown); and the array processor 72 conventionally includes an array of signal processing elements 74 (not shown). The APC computers provide general purpose processing capability for AP 72 and control the array of SPE's 74. The APC computers also interface with MUX bus of the system through direct access memory controller (DMAC) 78 and bus interface unit (BIU) 79. The APC A may perform the hardware bootstrap function for AP 72; and SPE array 74 provides the high speed signal processing for AP 72.

In a typical operation, SPE array 74 receives data from PBM 70 and performs signal processing instructions under the control of the APC A and APC B on the received data. SPE array 70 returns the processed data to the output buffer to be displayed. PBM 70 provides general data input/output services and bulk data storage capacity for the AP 72 or other system components. The basic functions of PBM 70 are to buffer data from the radar front end or antenna, provide it to the SPE array 74 and, buffer large arrays of intermediate data for the SPE array 74. The basic function of the output buffer to send the processed data to RVSP, map display or recording element.

In practicing the present invention, two foreground task tables are preferably provided for each control CPU. One foreground task table is dedicated to initialization functions, and the other for active mode operation. The initialization tasks which are carried out on CPU A include (a) computing the radar transmitter high voltage adjustment values, (b) setting up the specific array processor processing parameters, (c) setting up the specific synchronizer parameters, (d) initializing the beam step or "look" parameters, (e) initializing the sensitivity time control (STC) values, (f) initializing low power ratio frequency (LPRF) values, and (g) transmitting STC values to the SPE's. The initialization tasks carried out on the CPU-B computer include (h) capturing the initial line, of sight, (j) generating pattern raster generator (PRG) data for display formatting, (k) setting up the azimuth scan parameters, and (1) initializing the cursor and range rings.

The active processing tasks for CpU A of RC 76 may include (a) elevation beam tilt processing, (b) generation of beam pointing commands, (c) setting up of roll resolver angles, (d) computation of coordinate transformations for use in the SPE monopulse processing, (e) counting of beam steps or "looks" for determining when to dump azimuth lines to the display when each scan is complete, (f) generating and outputting the PRF's that are used, and (g) performing the range gate drift function. The active processing tasks for CPU B of RC 76 may consist of the various motion compensation functions needed to support the scanning of the antenna beam.

Figure 5:
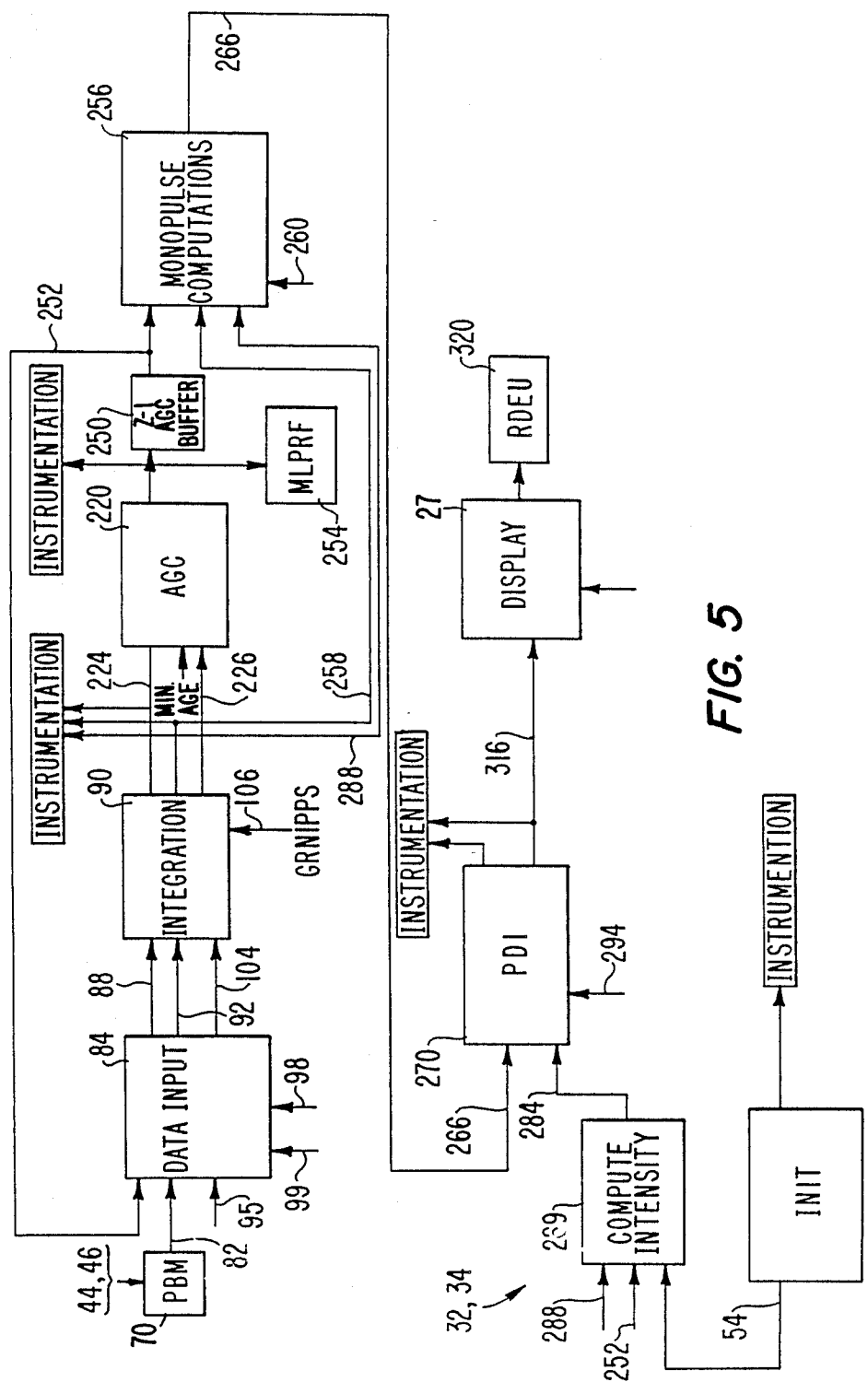
FIG. 5 is a more detailed functional block diagram of the system of FIG. 4 showing the flow and processing of information for each function of the system.

The method and system of the present invention is now described in more detail by referring to the functional block diagram of FIG. 5 and the subsequent FIGS. 6 through 12 illustrating the details of each of the functions of the block diagram of FIG. 5.

As shown in FIG. 3, the channel data Σ and Δ received by respective Σ and Δ receivers 24 and 26, is output for both in-phase I and quadrature phase Q over lines 44 and 46, then stored for processing in processor bulk memory PBM 70 of AP 72; and output under the control of APC-B over output line 82 to an input data function 84. It should be noted that in accordance with the present invention both Σ and Δ data I,Q for both azimuth and elevation Δ channels are processed. In one embodiment a maximum of four hundred complex monopulse range gates are input for each interpulse period (IPP). The IPP's are input three at a time, and presummed in order to reduce the amount of memory used. Azimuth and elevation IPP's are input during each look of the antenna. The total number of IPP's that are processed during each look is controlled by a value of a control word GRNIPPS. Each IPP is processed twice for each look, once for horizontal or azimuth, and once for elevation. There are four data points Σi, Σq, Δi, and Δq for each range gate of each pulse; These four data points are packed into two words of twelve bits each by the receivers 24 and 26 as follows.

| 1 | DEL I | 1 | SUM I | 1 | LSB, word 1 |
| 1 | DEL Q | 1 | SUM Q | 1 | LSB, word 2 |

Figure 6:
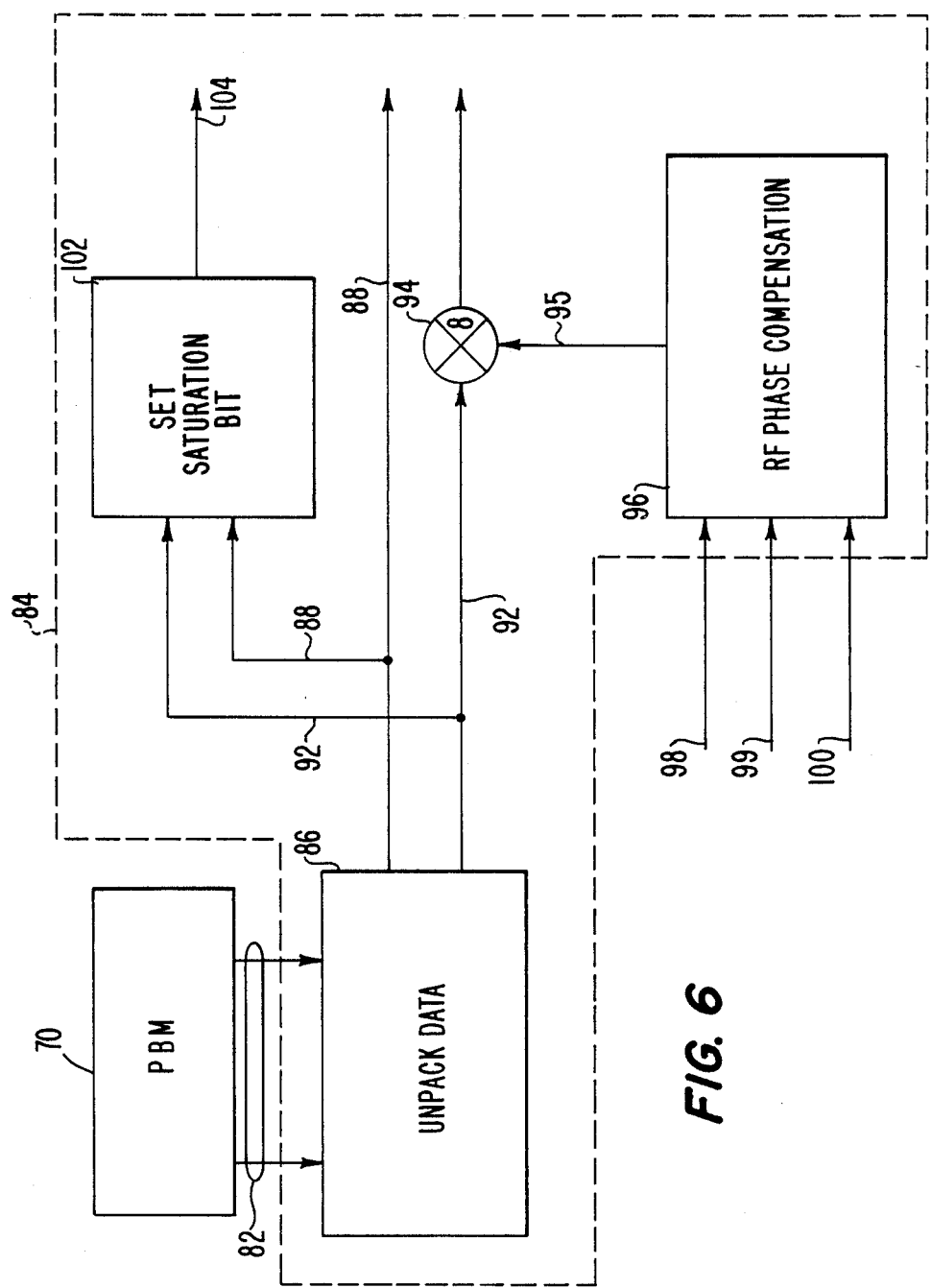
FIG. 6 is a more detailed block diagram of the data input function of FIG. 5.

The data is unpacked as indicated by function block 86 of FIG. 6; and the Σ data is output over line 88 to an integration function 90; while the Δ data is output over line 92, and RF phase compensated by multiplying the Δ data by one complex number for each range gate as indicated at 94. A function, illustrated at 96 of FIG. 6 provides the complex number for the RF phase compensation in accordance with a subband and frequency index on inputs 98 and 99. The state of the RF attenuator input on line 100 is saved by the array processor AP on a range gate basis during automatic gain control (AGC) processing. The memory arrays are used to access the RF phase compensation values residing in SPE memory.

The Σ and Δ data on outputs 88 and 92 of function block 86 are also input to a saturation detection function 102 to determine if a particular range gate is saturated; that is, to determine whether or not the range gates on either side of a candidate range gate are indistinguishable from such candidate range gate. If saturation of a particular range gate has occurred, function block 102 sets output data on line 104 to −32; and if any of the four data points for a range gate is saturated, the fact is saved and used to prevent the saturated range gate from being presummed. A detected saturation results in setting of a saturation bit at 102 and outputting the saturation bit on line 104. A saturation bit is provided for each range gate of each interpulse period.

Figure 7:
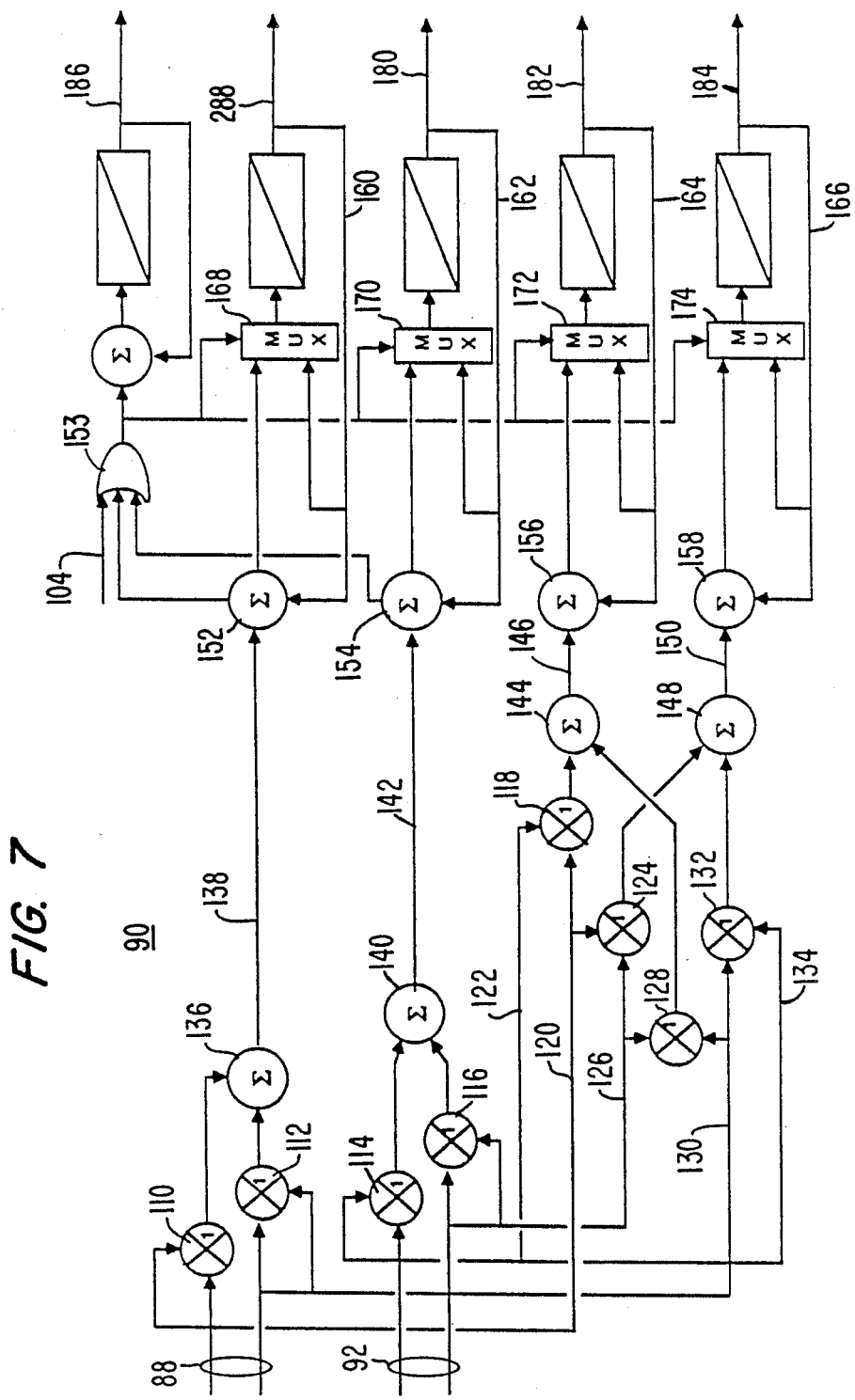
FIG. 7 is a more detailed block diagram of the pre-summing integration function of FIG. 5.

As previously mentioned and referring to FIG. 7, the processed range gates in azimuth and elevation are integrated or presummed at function block 90. The presumming occurs for each unsaturated range gate twice for each look, first for elevation, and then for azimuth. The number of IPP's that are to be integrated or presummed during each look, represented by the control word GRNIPPS, is input on line 106.

Referring again to FIG. 7, the Σ and Δ channel data is input from data input function 84 over lines 88 and 92, respectively. ΣI data is multiplied by itself at multiplier 110; ΣQ data is multiplied by itself at multiplier 112. ΔI data is multiplied by itself at 114; and ΔQ data is multiplied by itself at 116. Also, ΣI data is multiplied by ΔI data at multiplier 118, which data is input over lines 120 and 122, respectively. ΣI data is multiplied by ΔQ data at multiplier 124 over lines 120 and 126. ΔQ data is multiplied by ΣQ data at 128 over input lines 126 and 130; and finally, ΣQ data is multiplied by ΔI data at 132 over input lines 130 and 134. The process of presumming further includes integrating the output of multipliers 110 and 112 at 136 to obtain Σ Σ* on output 138; integrating the output of multipliers 114 and 116 at 140 to obtain an output Δ Δ* on line 142; integrating the output of multipliers 118 and 128 at 144 to obtain ReΔΔ* (the real part of the complex value ΔΔ*) on line 146; and finally the outputs of multipliers 124 and 132 are integrated at 148 to provide an output ImΔΣ* (the imaginary part of ΔΣ*) on line 150. Thus, input sums from integrators 136, 140, 144, and 148 are formed and correspond to ΣΣ*, ΔΔ*, and ΔΣ conjugate, respectively. The aforesaid sums are then integrated at 152, 154, 156, and 158 with similar integrated sums from other IPP's in the same azimuth and elevation gates. The sum of the total IPP's is fed back to corresponding last-named integrators over lines 160, 162, 164, and 166. An "OR" gate 153 provides an input to multiplexers 168, 170, 172, and 174, for preventing an output on respective lines 288, 180, 182, and 184. The sum of all the saturation bits for the IPP's of each range gate is output on line 186.

Overflow protection is provided by editing an IPP from all sums if that IPP will cause an overflow in either the ΔΔ* from integrator 154, or the ΣΣ* conjugate from integrator 152. The product select for the multipliers is set to divide the output of each multiplier by two. The multipliers are implemented by a lookup table in the SPE memory. To save additional time in execution, this table is loaded starting at absolute address zero. Thus, entry zero is at address zero, entry for one squared is address one. The entry for −1 squared is address -one (FFF for the twelve bit SPE memory), and so on.

Figure 8:
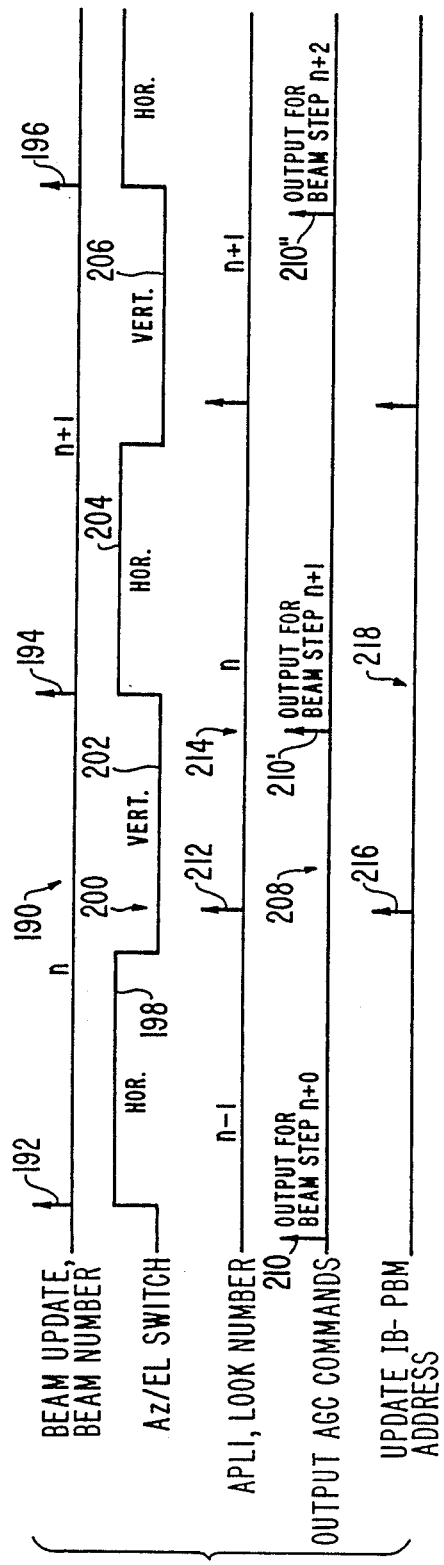
FIG. 8 is a timing diagram graphically illustrating the processing times of azimuth and elevation channel data during each "look" of the antenna.

Prior to discussing the remainder of the process of the present invention, reference is made to the timing diagram of FIG. 8, which illustrates the process timing of the array processor AP 72 for data associated with a "look" or beam step n of the antenna. Horizontal line 190 represents the timing of successive antenna looks. Line segment n between arrows 192 and 194 represents the processing time of look n; segment n+1 between arrow 194 and 196 represents the processing time for the subsequent look n+1 of the antenna, and so on. As previously mentioned, the processing for each look includes both azimuth and elevation, thus line segment 198 of line 200 represents the presumming azimuth or horizontal data for beam step or look n and line segment 202 represents the timing for the elevation or vertical processing of beam step n. Similarly, line segment 204 represents the azimuth processing for beam step n+1. Vertical IPP's represented by line segments 202 and 206 are not used for AGC processing. Line 208 represents the timing of the automatic gain control AGC commands for each beam step. Arrows 210, 210', and 210'' represent the output of AGC commands for beam steps n, n+1, and n+2, which commands are based upon the horizontal data of the preceding beam step. Thus, after the horizontal processing for each look, the look number is updated as indicated by arrow 212 of line 214, and the address in the processor bulk memory PBM 70 for data associated with beam step n is updated as represented by arrow 216 of line 218. Thus, each AGC update is controlled by the preceding "look".

Referring again to FIG. 5, the computation of the AGC error and the lookup of the commands are carried out at 220, which commands are based upon the integrated presummed data from function block 90 for the previous beam step, as discussed in connection with FIG. 8. In order to output the AGC commands on lines 224 and 226 before the beam step update, only the horizontal monopulse IPP's $\Delta\Delta^*$ and $\Sigma\Sigma^*$ are used for AGC processing as previously mentioned.

Figure 9:
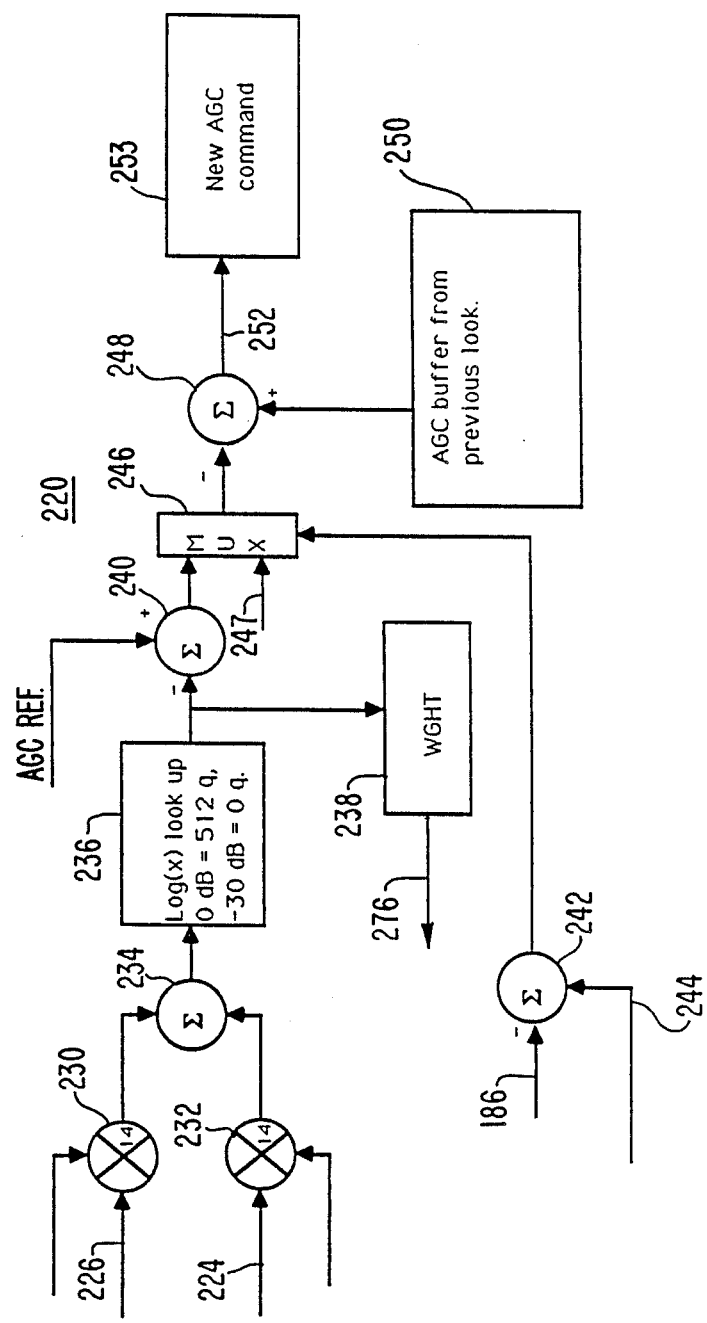
FIG. 9 is a more detailed block diagram of the automatic gain control (AGC) function of FIG. 5.

The AGC processing function is shown in more detail in FIG. 9. The $\Sigma$ and $\Delta$ detected power of the horizontal pulses on lines 226 and 224 are scaled at multipliers 230 and 232 respectively. In one actual reduction to practice, the scale factor for $\Sigma\Sigma^*$ on line 226 is 1024 for twelve IPP's; and the scale factor for $\Delta\Delta^*$ on line 224 is 683 for twelve IPP's. The scaled pulses are added together at 234, and converted to units of decibels (dB) at block 236. The lookup table at block 236 extends from zero dB for 512 quanta to −30 dB for zero quanta. The decibel AGC data is weighted and saved for map processing as indicated at block 238. The AGC data is summed at 240 with an AGC reference value to keep the AGC value at −7 dB from A/D saturation; or in other words −7 dB below 512 quanta. A/D saturation is defined as maximum input (s+5=31) presummed. The saturation count of the data from line 186 (see FIG. 7) is compared at 242 with the maximum allowed saturation count on line 244. When the actual saturation count on line 186 is greater than the maximum allowed saturation count on line 244, the most significant bit of the twelve bit word is set to one in multiplexer 246. Thus, if more than the maximum number of A/D and presum saturations that are allowed in a range gate occur, the AGC error is overwritten, and the attenuation for that range gate is increased by 7 dB as indicated by input 247 to MUX 248. This attenuation of the AGC command causes it to recover from saturation quickly.

Because of slow attenuator switching times, the range gate to range gate variation in AGC commands is limited. Also, the AGC commands must be equal to or exceed the AGC floor or minimum AGC. The floor is computed each "look" by adding the bias value, which is used to convert the curve of the sensitivity time control STC map to the curve of the AGC floor, to the STC curve formed by integrating a plurality of range gates. The output of MUX 246 is summed at 248 with the AGC command from the previous beam step in buffer 250. The result is the new AGC command for the subsequent beam step as discussed in connection with FIG. 8. The sum of the current AGC error and the previous AGC command on line 252 is formatted by a function 254, for deciding how to apply both the IF and RF attenuation. Attenuation commands are buffered by AP 72 at function 256 for use by phase and gain compensation routines at block 84. In one actual reduction to practice, the maximum IF attenuation is 47 dB; and the RF attenuator is set at 45 dB attenuation when in the "on" state.

Referring to the function block 256 of FIG. 5, the Im ($\Delta\Sigma^*$) on line 258 from the presumming function 90 is the SPE memory. The IF attenuation values are used as indexes into the IF compensation tables. A subband number corresponding to average gain compensation is supplied by the CPU of the RC module and shown as input 260 (FIG. 5) to provide an average gain compensation value for the subband frequencies. Only one subband is commanded by the RC during each look. Both, vertical and horizontal $\Delta$ data are compensated. Only, the imaginary component of the $\Delta\Sigma^*$ cross product is saved for determining the ratio of $\Delta$ to sum in the monopulse off-axis processing.

Figure 10:
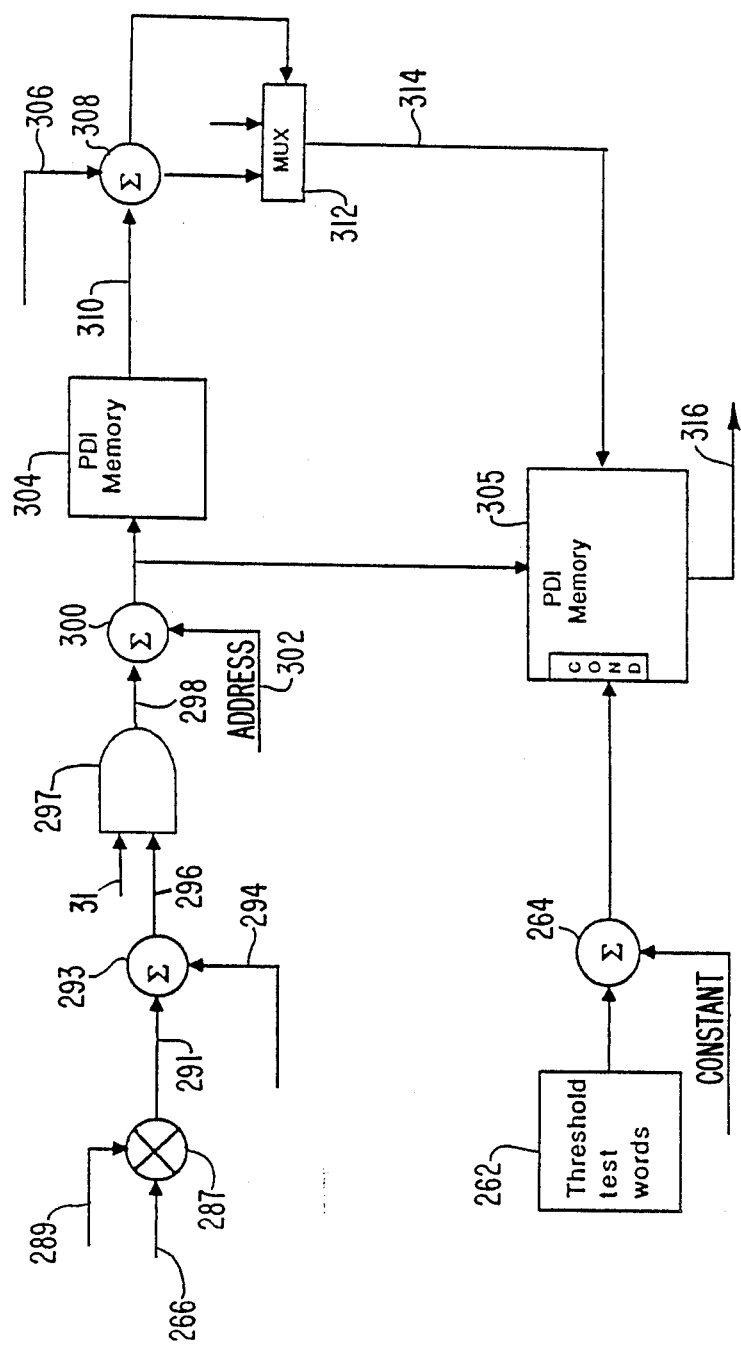
FIG. 10 is a more detailed block diagram of the post detection integration (PDI) function of FIG. 5.

Referring to FIG. 10, and prior to calculating the monopulse data, tests are performed as indicated at block 262 on the data at each look to determine if the monopulse measurement is to be used. Each test, sets a bit in a threshold word. The word is summed with a constant at 264. In the event that the test fails, the most significant bit is ONE, and the remaining threshold bits become zero. This inhibits the use of the data on a range gate basis should the test fail. The first test checks that the power in the $\Delta$ channel is less than the power in the $\Sigma$ channel. This ensures that the monopulse measurement is in the main lobe of the antennae beam. Another consequence of this test is that power in the $\Delta$ channel being greater than the $\Sigma$ channel may indicate the presence of noise, which inhibits integration. The second test checks to determine whether or not the magnitude of the output of the Im ($\Delta\Sigma^*$) is not too large, greater than 0.3 of a beamwidth for example after IF phase and RF gain compensation. This test provides a finer resolution check for ensuring that the monopulse ratio measurement occurs near the center of the beam.

In the present invention, the off-boresight angle is calculating in function block 256 by first taking the ratio of the delta over $\Sigma\Sigma^*$ for the return pulses. As embodied herein and referring again to FIG. 5, the monopulse computations are carried out by forming the $\Delta/\Sigma$ ratio for both the horizontal and vertical monopulse data in order to determine the off-boresight angle of the reflected pulse in both azimuth and elevation. The denominator $\Sigma^*$ is used as an index in a K/X lookup table for implementing the dividing function. The lookup table may be comprised of IK twelve bit words scaled into fifteen fractional bits. The output is scaled so that a $\Delta/\Sigma$ ratio of "one", corresponding to the center of the beam is equal to 512 or 9 fractional bits. This calculation requires that a fast PBM mode be selected.

In accordance with the present invention, the calculated off-boresight, angles are converted to space coordinates corresponding to a local horizontal plane. Thus, as embodied herein, the next step in the process at block 256 of FIG. 5 is beam shape compensation wherein monopulse ratio data are converted to antenna coordinates to form the azimuth components. The space to body and monopulse slope and curvature compensation is performed. The beam slope and curvature compensation values are provided by lookup tables; and the monopulse data is converted from the antenna coordinates back to space coordinates. The final output from function block 256 on line 266 is scaled so that forty quanta of the $\Delta$ horizontal is equal to one millisine.

Figure 11:
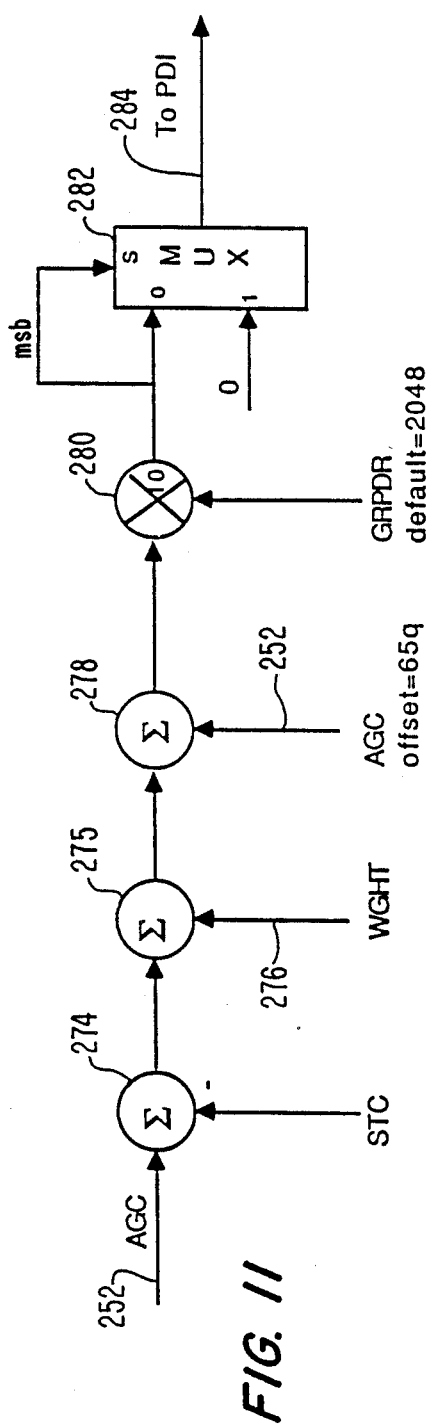
FIG. 11 is a more detailed block diagram of the Intensity Computation function of FIG. 5.
Figure 12:
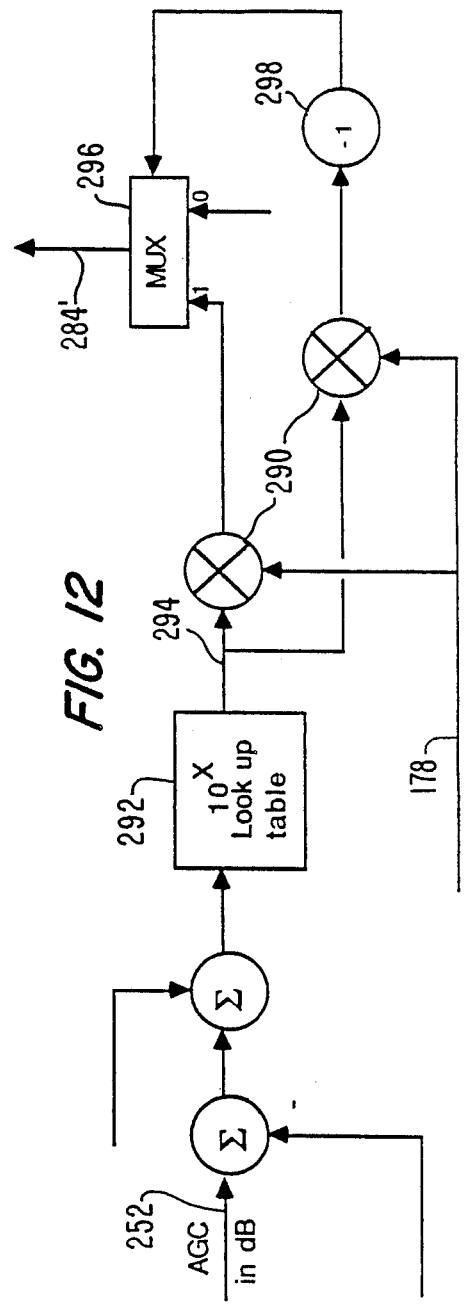
FIG. 12 is a more detailed block diagram of the Display transfer function of FIG. 5.

Two methods are provided at function block 269 for computing the intensity of the horizontal and vertical channels that are input to the map integrator PDI indicated at block 270 of FIG. 5. One method is illustrated in FIG. 11, and another method is illustrated in FIG. 12. The first described method adjusts the values using only addition and subtraction functions working in logarithmic values. It uses the $\Sigma$ data in units of dB from AGC processing on line 252 and sums this value with the negative of the sensitivity time control STC value at 274. This sum is then added at 275 to the value stored in a weighting function 238 (see FIG. 9) on input line 276. The result of this addition is summed at 278 with an automatic gain control value that is offset by sixty-five quanta, which result is in turn scaled at multiplier 280 by a scaling factor GRPDR corresponding to s+5w+10f (sign, 5 whole, 10 fractional) bits. The scaled value is then available at 282 to provide an intensity value to PDI function 270 on line 284 where the intensity value is added to the selected azimuth bin.

The second method for computing the intensity, as shown in FIG. 12, involves applying an STC function to the integrated ΣΣ*date and adding the Σ channel data to provide the data on input line 288 from the output of integration unit 90. The data on line 288 is divided by two and rounded off to maintain signal level. The STC function ensures that the same size targets provide proper intensity regardless of range. A back end STC function is performed on the magnitude of the data by multiplying each range gate by a factor that corresponds to the AGC command on line 252 minus the required map STC attentuation. The output is converted from units of dB to quanta at lookup table 292 of FIG. 12 to produce twelve bit words on output line 294. Multiplication occurs at 290, the product of which tested for being negative at 298 prior to being at 296 for output to the post detection integration function 270 on line 284.

Referring to FIG. 5, Δvalues corresponding to Δ horizontal millisines on output 266 are input to post detection integration function 270 where the azimuth data in a specific azimuth beam is integrated once each look. At PDI function 270, the azimuth offset from the center of the beam is converted to a bin offset. It follows, that the azimuth bin at the center of the beam has zero offset. The integrated horizontal pulses are allocated to the correct azimuth bin.

More specifically, and as shown in FIG. 10, an azimuth bin offset in millisines is determined at 287 by the product of a value corresponding to one over bin size on line 289 and the Δmonopulse horizontal measurement in millisines on line 266. The value on line 289 is scaled to two to the fifteenth power to convert the value from millisines to an azimuth bin offset. As previously mentioned, bin size is preferably forty-quanta per millisine. The bin offset on line 291 is summed at 293 with a bin number that corresponds to the center of the beam input on line 294. The output on line 296 is then "anded" with decimal 31 or hexadecimal IF at 297, for limiting the bin number to the maximum number of bins per beamwidth on line 298. The bin number selected on line 298 is then summed at 300 with an address on line 302 for placing the selected bin number in a post detection integration memory 304 and 305.

As shown in FIG. 10, the intensity data at block 269 (FIG. 5) from the current look on line 306 for each range gate is added at 308 to the integrated value of a range cell for a selected bin on line 310. When the RC commands an azimuth line to be dumped, each range gate of the oldest azimuth line in memory 304 is multiplied by a constant at 312, and limited to eleven bits. The saturation limiting is required to conform to the size limits of the lookup table. Thus, the magnitude data of an azimuth bin is output on line 314 (FIG. 10) and compared with the threshold test words at 305 as previously discussed. If the value on line 314 meets the threshold test, then the output data for an azimuth bin of a range cell is output on line 316. This data is LOG compressed at block 36 (see FIG. 3) and transferred to the radar display unit 320. An azimuth line is only dumped and displayed once during each "look." In one embodiment, a total number of 400 azimuth bins or azimuth lines are provided in each look. During each "look," the current "look" is integrated with the previously integrated twenty-seven looks for example, and then dumped to the display. Each contiguous bin is displayed in succession by a conventional pattern raster generator; and the bin being processed is immediately adjacent the previously displayed azimuth line.

In summary, and in accordance with one actual reduction to practice, monopulse data received at X-band is used. The two channel receiver collects the SUM signal return for each pulse and time shares the difference (DELTA) channel to collect either azimuth or elevation data for a particular pulse. The RF data is down converted to base band and digitized. The digitizer forms both i (inphase) and q (quadrature) components to maintain phase information.

For each range gate input the data is corrected to compensate for phase and gain variations between the RF sections of the SUM and DELTA channels. After compensation the following 3 sums of multiple pulses are formed, i.e., the results for each complex range gate for a number of pulses are added together. SUM channel data is complex multiplied by the SUM channel conjugate to form the SUM channel power. The DELTA channel power is formed the same way. The difference channel is complex multiplied by the SUM channel conjugate, to form the "DELTA-SUM cross product".

Both the real and imaginary parts of the DELTA-SUM cross product are corrected for phase and gain imbalance between the IF sections of the SUM and DELTA channels in the receiver. After all compensations are complete and a complex multiply by $(0,-j)$, only the real part of the DELTA-SUM cross product is saved.

Tests on the data are performed each look to decide if the monopulse measurement data is of high enough quality to be used.

Next the real part of the DELTA*SUM product is divided by SUM*SUM conjugate product to form the off-boresight measurement. This ratio is formed for both the horizontal and vertical data. Using a DELTA to SUM ratio allows the measurement to be independent of target cross section. Therefore an accurate off-boresight angle can found. Decoupling the horizontal and vertical data by beam shape compensation and roll removal follows. Decoupling requires horizontal, vertical and aircraft attitude information. This will yield the azimuth angle of the target relative to the center of the beam. Azimuth angle of the center of the antenna is added to the offset to find the measured azimuth of the return. Intensity data is added to the map integator memory at the azimuth cell indicated, for each range cell. When an azimuth line can no longer be integrated (too far from the center of the beam) the data is log compressed and displayed.

The intensity input to map integrator memory is based on the SUM channel power. Processing is done to model an R**3 sensitivity time control (STC) curve.

It will be apparent to those skilled in the art that various modifications and variations can be made in the method and system of ground mapping of the present invention, without departing from the spirit or scope of the invention. Thus, it is intended that the present invention cover the modifications and variations of this invention provided they come within the scope of the appended claims and their equivalents.

What we claim is:

1. A method of real aperture radar ground mapping, comprising:

scanning a monopulse antenna having a central boresight, over a ground surface area to be mapped;

transmitting along the boresight a plurality of radar pulses, each having a predetermined angular beamwidth, during each of a plurality of spaced azimuth intervals, each azimuth interval defining an antenna look, the transmitted radar pulses during each look illuminating a total ground area in azimuth corresponding to the beamwidth thereof;

receiving and detecting at the antenna, during each look, return energy of the reflected pulses of the illuminated area at distinct times corresponding to respective range intervals;

calculating a predetermined plurality of distinct off-boresight angles of the return energy for each range interval;

converting each of the plurality of calculated off-boresight angles to a different contiguous azimuth bin for each range interval, each azimuth bin corresponding to a fractional portion in azimuth of the total illuminated ground area during each look;

displaying the detected reflected energy of each distinct azimuth bin in successive azimuth bins of the total illuminated ground area for subsequent antenna looks.

2. The method of claim 1, wherein the offboresight angle is calculated in accordance with the ratio of the sum and difference data of the return energy pulses.

3. The method of claim 2, wherein the denominator of the ratio is used as an index in a look up table for performing the division.

4. The method of claim 3, wherein the lookup table includes at least 1K of twelve bit words scaled into fifteen fractional bits.

5. The method of claim 1, wherein the step of calculating includes monopulse processing of the return energy in the horizontal and vertical dimensions between each look of the antenna to obtain horizontal and vertical data;

generating an automatic gain control command during the collecting of the vertical monopulse data for each look in accordance with the value of the horizontal data for the same look; and processing the horizontal data for each subsequent look in accordance with said generated command for adding to each bin a value corresponding to the strength of the calculated return energy.

6. A system for real aperture radar ground mapping, comprising:

a monopulse antenna having a central boresight;

means for scanning the antenna over a ground surface area to be mapped;

means for transmitted along the boresight a plurality of radar pulses, each having a predetermined angular beamwidth, during each of a plurality of spaced azimuth intervals, each interval defining an antenna look, the radar pulses during each look illuminating a total ground area in azimuth corresponding to the beamwidth thereof;

means for receiving and detecting at the antenna, during each look, return energy of the reflected pulses of the illuminated area at distinct times corresponding to respective range intervals;

means for calculating a predetermined plurality of distinct off-boresight angles of the return energy for each range interval;

means for converting each of the calculated off-boresight angles to a different contiguous azimuth bin for each range interval, each azimuth bin corresponding to a fractional portion in azimuth of the total illuminated ground area during each look; and display means, for displaying the return energy of each distinct azimuth bin in each successive azimuth bin of the total illuminated ground area for subsequent antenna looks.

7. The system of claim 6, wherein the means for calculating the off-boresight angles includes means for determining the ratio of the SUM and DIFFERENCE data of the return energy.

8. The system of claim 7, wherein the ratio determining means includes a lookup table for performing the division.

9. The system of claim 8, wherein the lookup table includes at least 1 k of twelve bit words scaled to fifteen fractional bits.

10. The system of claim 6, wherein the means for receiving and detecting includes means for monopulse processing of the return energy in the horizontal and vertical dimension during each look of the antenna; and means for generating an automatic gain control during the collecting of the vertical monopulse data between each look in accordance with the horizontal data for the same look; and means for controlling the processing of the horizontal data for each subsequent look in accordance with said generated command.

11. The method of claim 1, wherein the step of converting the calculated off-boresight angles includes the substeps of converting the horizontal and vertical monopulse data to antenna coordinates to form azimuth and elevation components; and converting the antenna coordinates to space coordinates.

12. The method of claim 11, wherein the substep of converting the off-boresight angles to antenna coordinates includes space to body transformation and the body to space transformation; and monopulse slope and curvature compensation.

13. The method of claim 12, wherein the monopulse slope and curvature compensation data is contained in a lookup table.

14. The system of claim 6, wherein the means for converting the off-boresight angles include means for converting the horizontal and vertical monopulse data to antenna coordinates to form azimuth and elevation components; and means for converting the antenna coordinates to space coordinates.

15. The system of claim 14, wherein the means for converting the off-boresight angle to antenna coordinates includes means for compensating for the monopulse slope and curvature of the beam.

16. The system of claim 15, wherein the converting means includes lookup tables having monopulse slope and curvature compensation data.

17. The method of claim 1, wherein the step of displaying includes displaying the return energy of a single bin during each successive look to the antenna.

18. The system of claim 14, wherein the means for displaying includes means for displaying the return energy of a single azimuth bin during each look.

* * * * *